(12) United States Patent
Watson (10) Patent No.: US 6,233,605 B1
(45) Date of Patent: May 15, 2001

(54) LOW-BANDWIDTH REMOTE CONFERENCING

(75) Inventor: Gary E. Watson, Dayton, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/112,961

(22) Filed: Jul. 9, 1998

(51) Int. Cl.[7] ................................................. G06F 15/16
(52) U.S. Cl. ........................ 709/204; 709/200; 709/248
(58) Field of Search .................................. 709/200, 204, 709/248

(56) References Cited

U.S. PATENT DOCUMENTS

| | | | |
|---|---|---|---|
| 5,572,582 | * 11/1996 | Riddle .................................. | 379/202 |
| 5,583,993 | * 12/1996 | Foster et al. .......................... | 709/205 |
| 5,594,859 | * 1/1997 | Palmer et al. ........................ | 395/330 |
| 5,659,692 | * 8/1997 | Poggio et al. ........................ | 395/330 |
| 5,822,525 | * 10/1998 | Tafoya et al. ........................ | 709/204 |
| 5,828,838 | * 10/1998 | Downs et al. ........................ | 709/204 |
| 5,841,977 | * 11/1998 | Ishizaki et al. ....................... | 709/204 |
| 5,854,893 | * 12/1998 | Ludwig et al. ....................... | 709/204 |
| 5,867,653 | * 2/1999 | Aras et al. ............................ | 709/204 |
| 5,889,945 | * 3/1999 | Porter et al. ......................... | 709/204 |
| 5,909,543 | * 6/1999 | Tanaka et al. ......................... | 348/15 |
| 5,916,302 | * 6/1999 | Dunn et al. ........................... | 709/204 |
| 5,953,050 | * 9/1999 | Kamata et al. ......................... | 348/15 |
| 5,974,446 | * 10/1999 | Sonnenreich et al. ............... | 709/204 |
| 5,991,385 | * 11/1999 | Dunn et al. ........................... | 379/202 |
| 6,148,068 | * 11/2000 | Lowrey et al. ....................... | 379/202 |

* cited by examiner

Primary Examiner—Saleh Najjar
(74) Attorney, Agent, or Firm—Gregory A. Welte (57) ABSTRACT

A remote conferencing system. Prior to a conference, visual images are distributed to computers of conference participants. Also, conference participants are supplied with pictures of all other participants. During the conference, one participant, a leader, periodically issues selection signals to all computers, causing them all to select one of the distributed images, and display it. In addition, the participants hold a telephone conference while viewing the images. The selection signals and the telephone conference are carried by a single voice-grade telephone channel.

4 Claims, 12 Drawing Sheets

LOW-BANDWIDTH REMOTE CONFERENCING

The invention concerns a remote conferencing system having restricted features, but compensates for the restricted features by being usable everywhere a voice-grade telephone channel is available.

BACKGROUND OF THE INVENTION

Multi-party telephone conferencing is in widespread use. However, one disadvantage of such conferencing is that all information within the conference is of the audio type, and no visual information is available. Another disadvantage is that the identity of a person speaking at any given time is not known to the others, except through recognition of the speaker's voice.

Thus, the following type of awkward situation frequently arises: if one participant wishes to comment on another participant's statements, the commentator, in general, cannot say, "I agree with Albert's position," because the commentator does not know whether Albert made the statements. The commentator generally uses a more stilted, and less friendly, phraseology, such as, "I agree with the last speaker," without naming that speaker.

An advancement over telephone conferencing is found in video conferencing, which adds video information to the audio conference. In a typical video conference, all parties view a common video image, and see video images of each other. When a participant speaks, the speaker can be readily identified, because the other participants see the speaker. The conferencing system can include sketching facilities, wherein a conference participant draws a sketch, and that sketch is reproduced on other computers.

However, video conferencing, in general, require high-bandwidth data channels, such as ISDN (Integrated Services Digital Network) service, communication satellite links, or an equivalent. Such channels are not in widespread use, and are far less available than ordinary telephone service. Thus, many people having access to telephone service cannot gain access to video conferencing.

In addition, high-bandwidth channels can be expensive. In 1998, one type of ISDN link imposes a fixed cost of about $50.00 per month, plus a per-minute usage charge. In addition to these costs, expensive equipment is required for video conferencing. Each participant requires (1) a video camera, (2) a microphone, (3) one or more expansion cards for a computer to digitize signals produced by the camera and microphone, (4) circuitry to interface with the high-bandwidth channel, and possibly other equipment.

OBJECTS OF THE INVENTION

An object of the invention is to provide improved remote electronic conferencing. A further object of the invention is to provide a system which achieves most of the functionality of video conferencing, in an inexpensive manner, using voice-grade telephone channels.

SUMMARY OF THE INVENTION

In one form of the invention, a collection of visual images is first transmitted to computers of all participants of a forthcoming conference. Then, during the conference, a leader issues selection signals to the computers, telling them which images to select, from the collection, and display. While viewing the images, the leader and the participants hold a telephone conference. A voice-grade telephone channel carries both the telephone conference and the selection signals, thereby reducing cost.

DETAILED DESCRIPTION OF THE INVENTION

Figure 1:
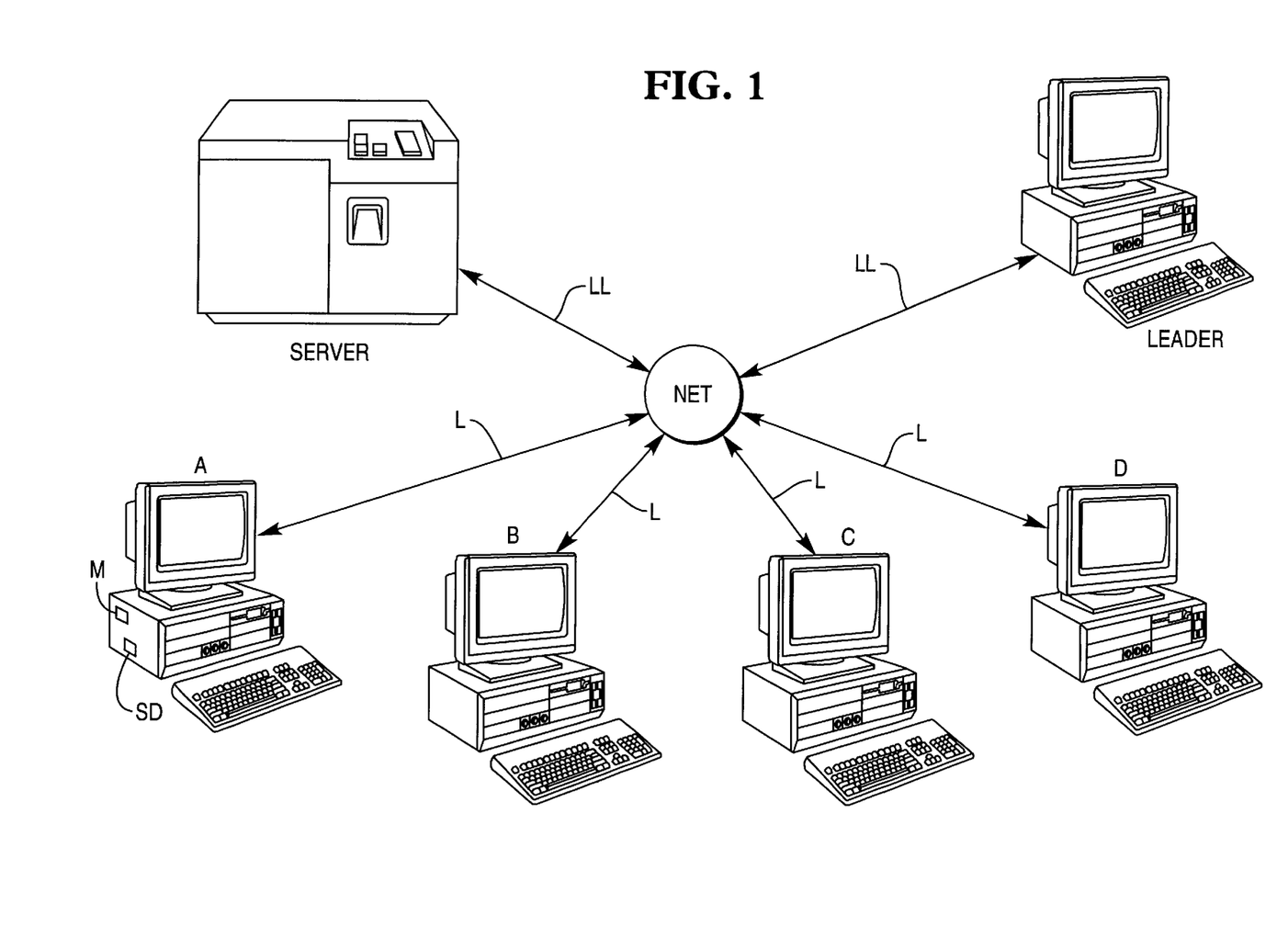
FIG. 1 illustrates computers linked by a network NET.

FIG. 1 illustrates five computers, labeled LEADER, A, B, C, and D. These labels will also refer to the human operators (not shown) of the computers. A SERVER is also shown. The computers and the SERVER are connected by a network NET, which can take the form of any suitable communication medium, but with the restriction that links L take the form of voice-grade telephone channels, or equivalent, which are commonly called "POTS" lines, which is an acronym for Plain Old Telephone Service. Link LL, used by the leader, may, or may not, be a POTS line. One characteristic of POTS lines is that the bandwidth lies in the range of 10–3,500 Hz.

The network NET is eliminated from subsequent Figures, to avoid clutter. Holding of a conference will now be discussed.

Figure 2:
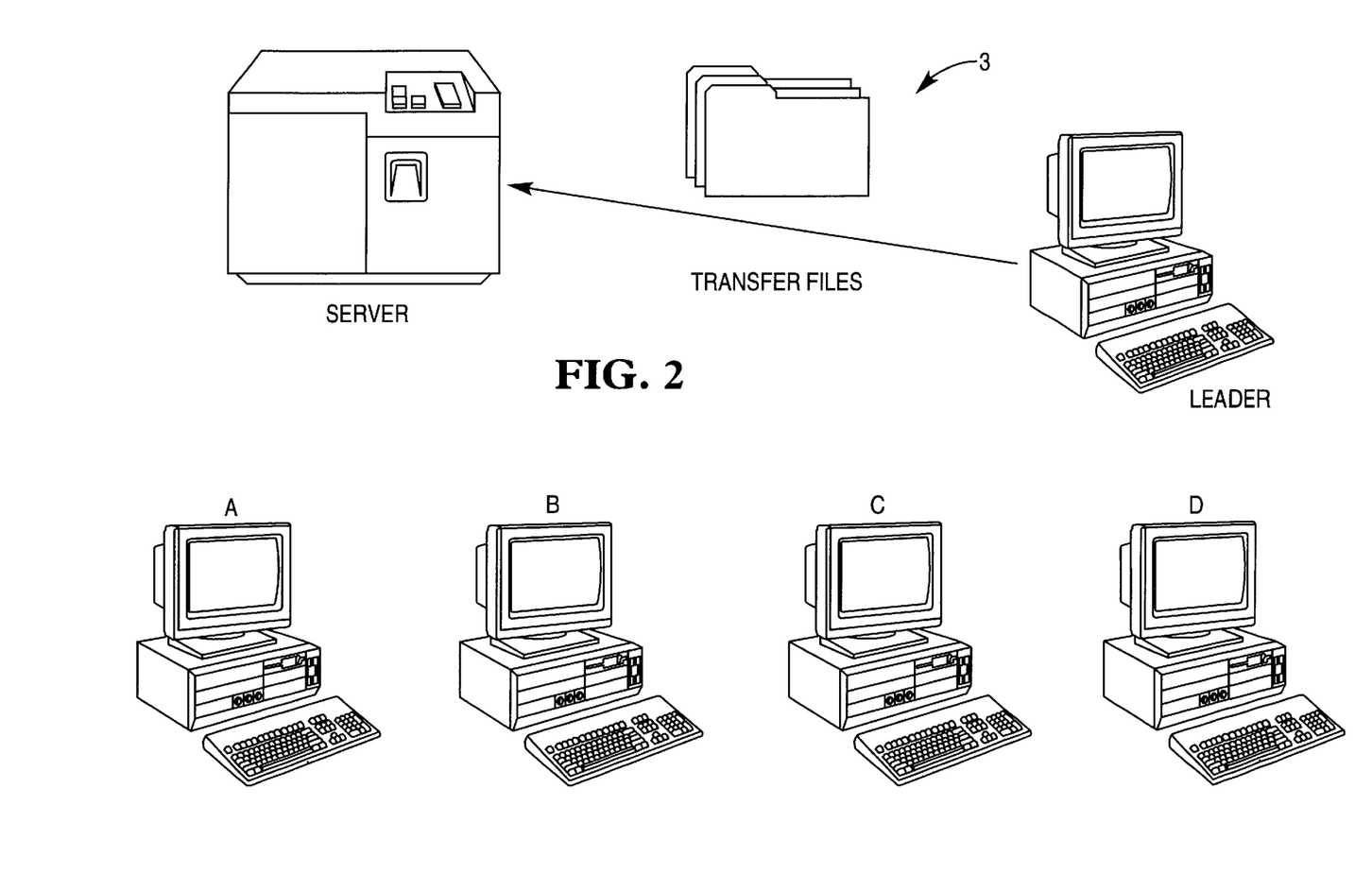
FIGS. 2–5 illustrate preliminary steps taken prior to a remote conference.
Figure 3:
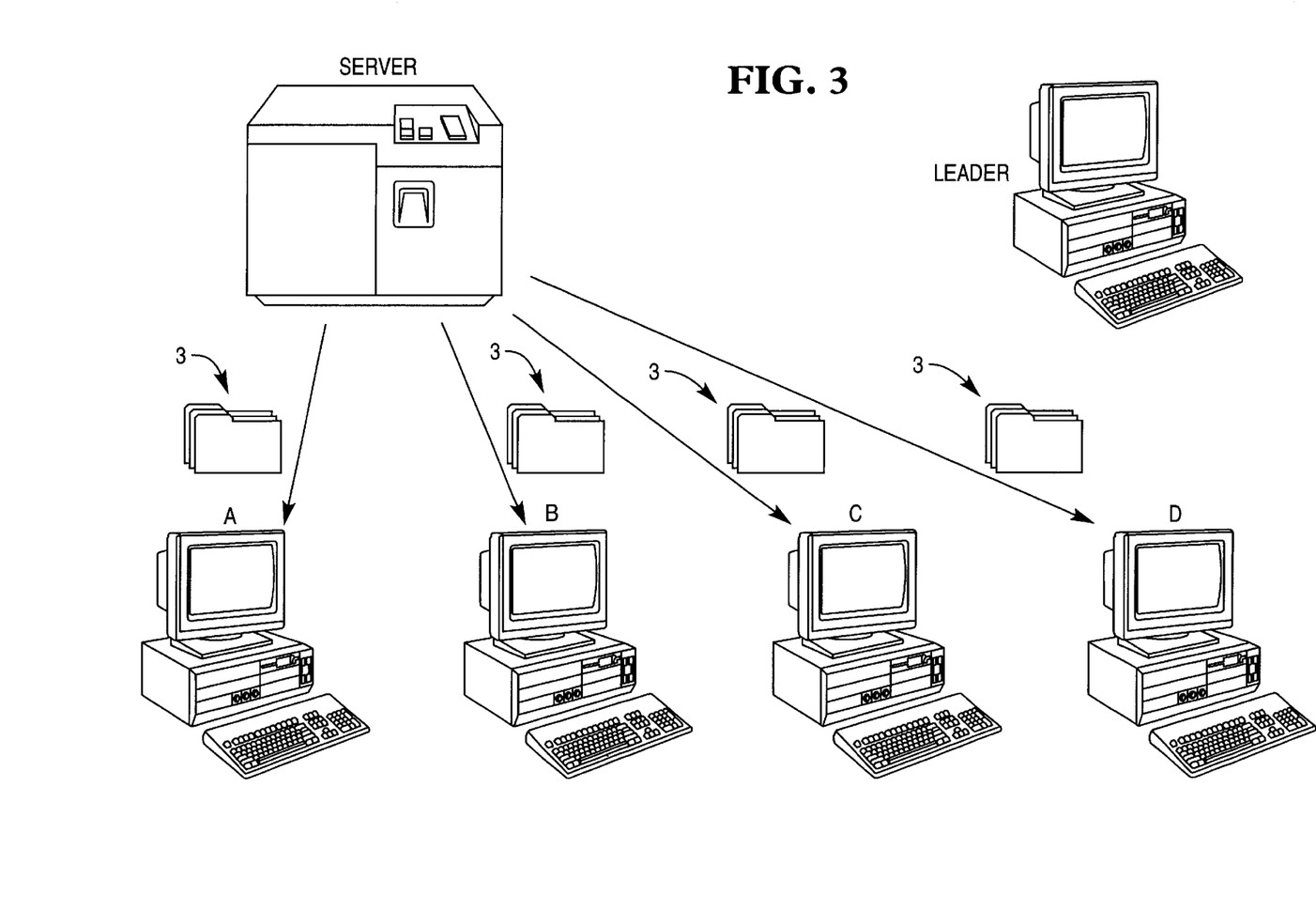

In FIG. 2, the LEADER transfers files 3 to the SERVER, using the network NET of FIG. 1. The SERVER then transfers a copy of the files 3 to each computer A–D, as indicated in FIG. 3. These files may contain visual images, which may be static or animated, silent or accompanied by audio information, which will be used in the upcoming conference.

As a specific example, the transferred information may include files usable by the software product POWERPOINT, which is sold by Microsoft Corporation, Redmond, Wash.

Figure 4:
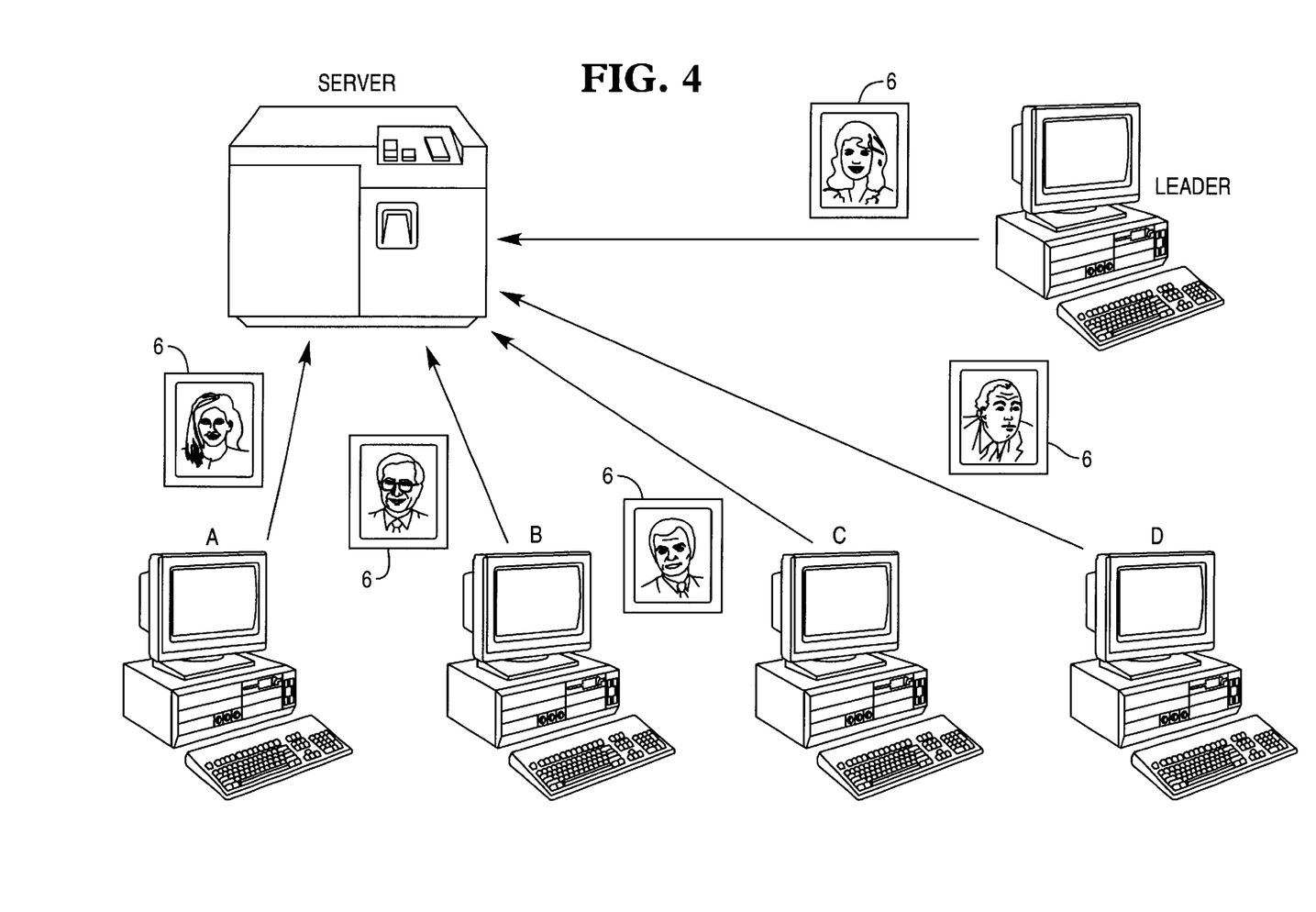
Figure 5:
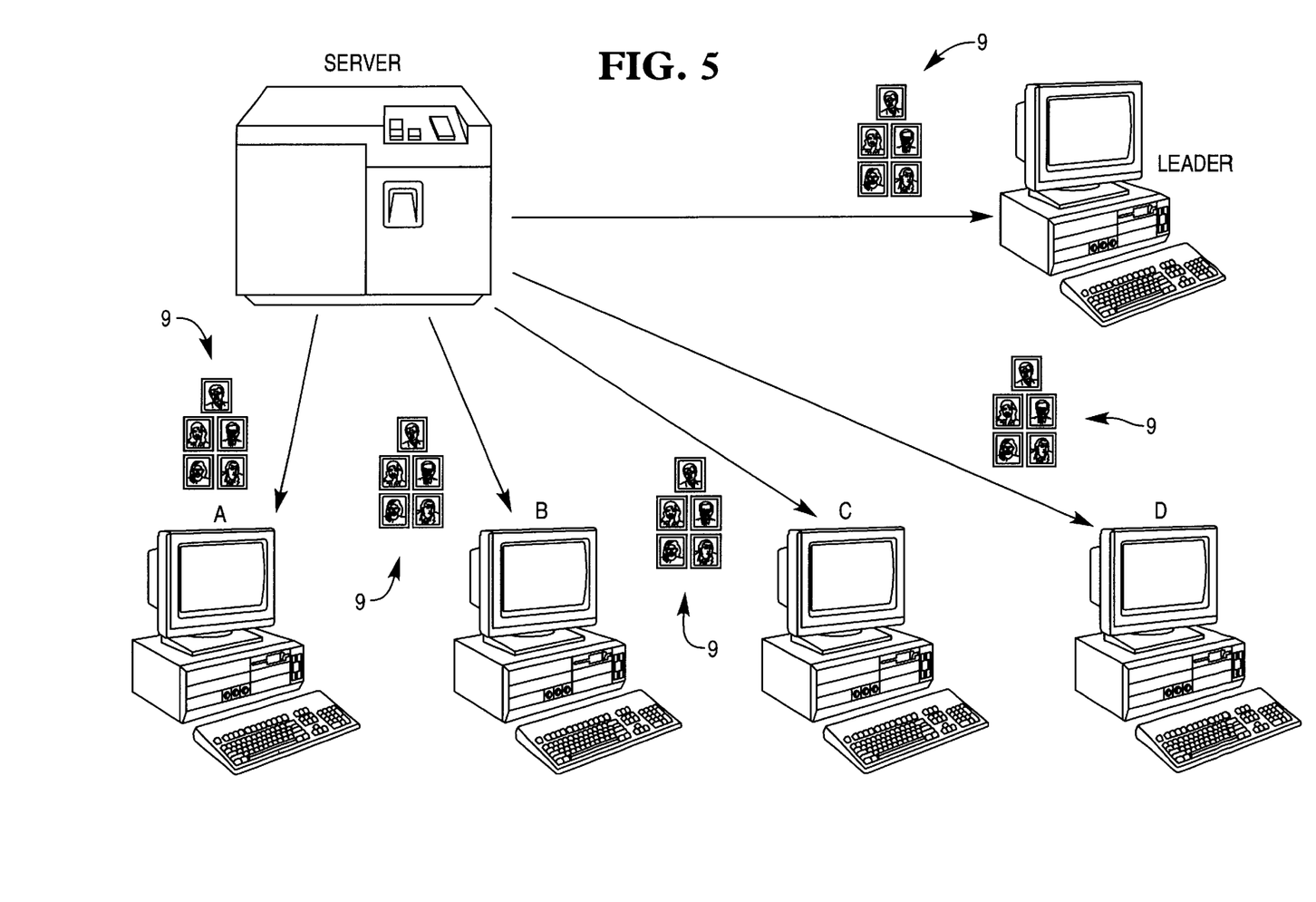

In FIG. 4, every computer transfers data 6 to the SERVER which contains a photograph of the computer's operator, together with the name of the operator. In FIG. 5, the SERVER transfers copies 9 of all photographs, and the corresponding names, to each computer.

After the operations of FIGS. 3 and 5, each computer stands in possession of (1) a digitized photograph of every conference participant and (2) a copy of the files 3 of FIG. 2. It is observed that the procedure, just described, for placing each computer into possession of these items is illustrative only, and other approaches may be taken. For example, the LEADER may maintain a site on the World Wide Web, which allows each conference participant to upload data, such as a digitized picture. Each participant can also download data from the site, such as the files 3 of FIG. 2 and the digitized pictures 9 of FIG. 5.

As another example of a transfer procedure, the LEADER may pass the files 3 of FIG. 2 to participant A by electronic mail. Participant A copies the files 3, and forwards them to Participant B, together with A's digitized picture. Participant B copies the files 3, adds B's digitized picture, and forwards the packet containing the files 3 and digitized pictures of A and B to participant C. This process proceeds until every participant obtains the files 3 and all digitized pictures.

As yet a third example, the necessary material can be distributed in the form of physical media, as by delivering floppy diskettes to all participants.

Figure 6:
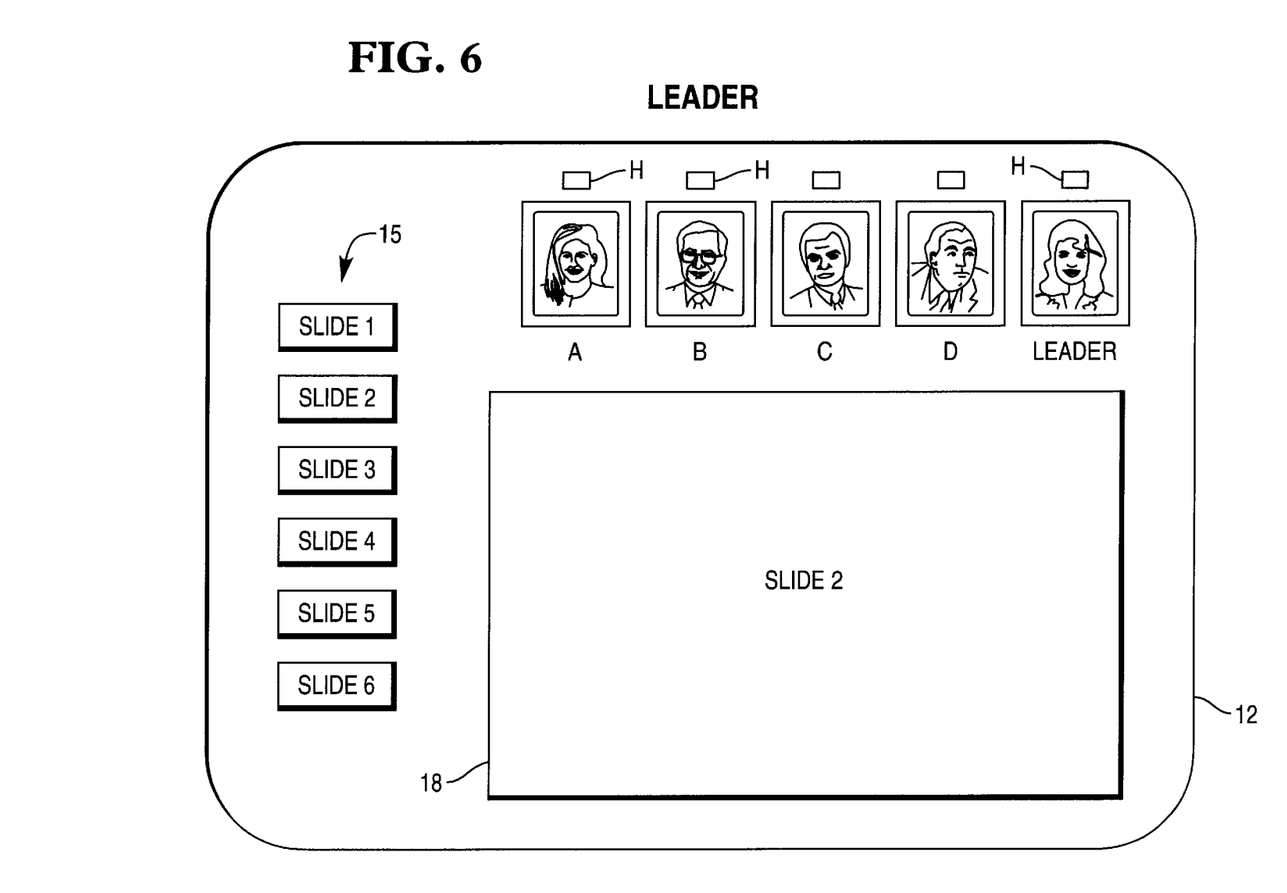
FIG. 6 illustrates the display 12 of the computer of the LEADER in FIG. 1.

Once all participants are in possession of the files 3 and digitized pictures, the conference can begin. The files 3 contain a sequence of visual images, which will be called "slides," analogous to 35 mm photographic slides. FIG. 6 illustrates the display 12 of the LEADER's computer. Pictures of the conference participants are arrayed across the top of the display 12, each labeled with the participant's name. If a given participant lacks a picture, a blank frame can be substituted for that picture. All participants' displays show these pictures and the participants' names.

At the left of display 12 is a column 15 of mouse-actuated buttons. Actuating a button causes a window 18 to display the corresponding slide. The window 18 shown contains slide number 2, indicating that the last button actuated was that labeled "SLIDE 2." In the POWERPOINT example, actuating a button causes the POWERPOINT software running on the LEADER's computer to display the corresponding image.

Figure 7:
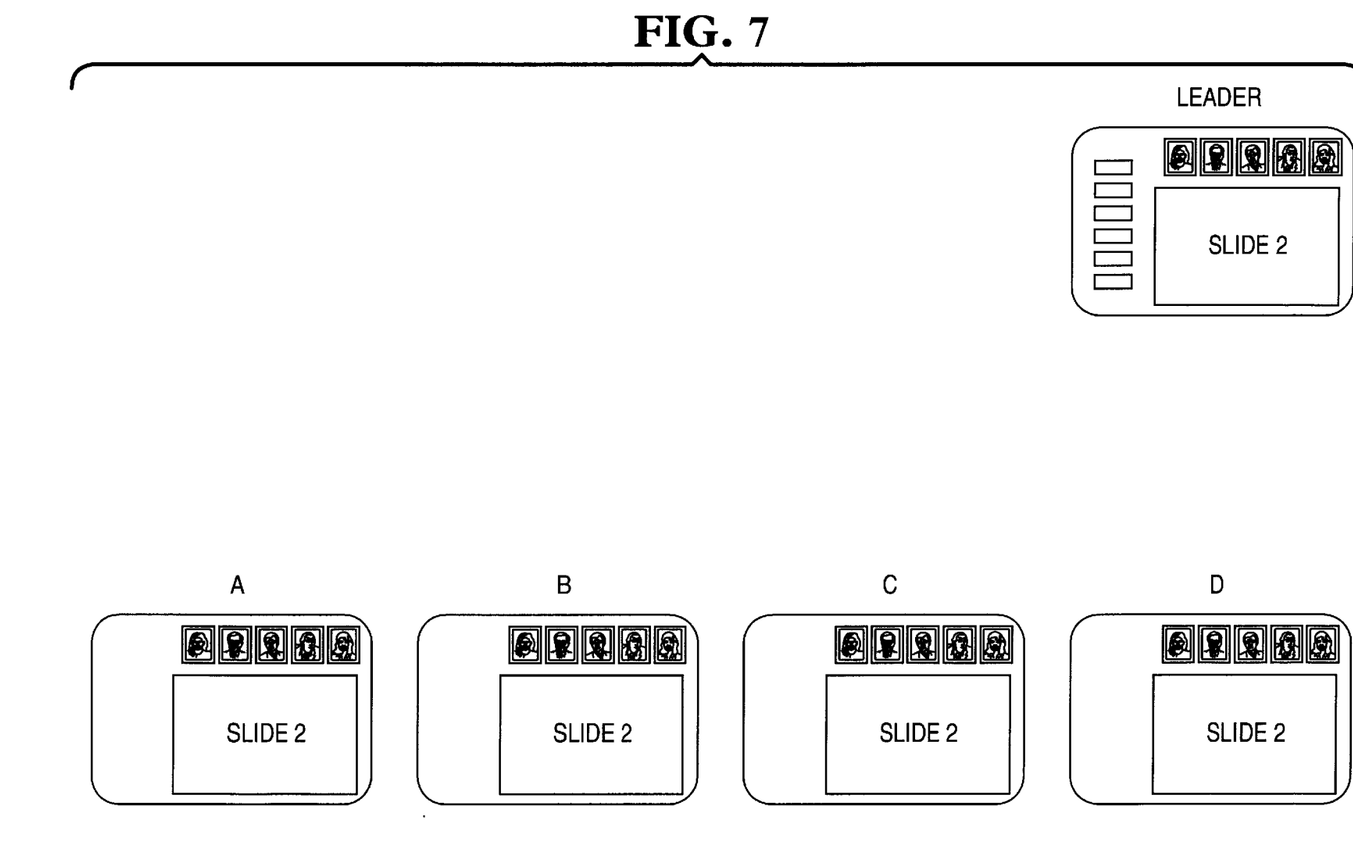
FIG. 7 illustrates how all computers can display a common image during the conference.

This button-actuation also causes a message to be sent to all other computers, which are computers A–D in this case, which causes them to display the same slide, namely, slide 2, as shown in FIG. 7. In the POWERPOINT example, the messages are delivered to POWERPOINT software running on the participants' computers.

Figure 8:
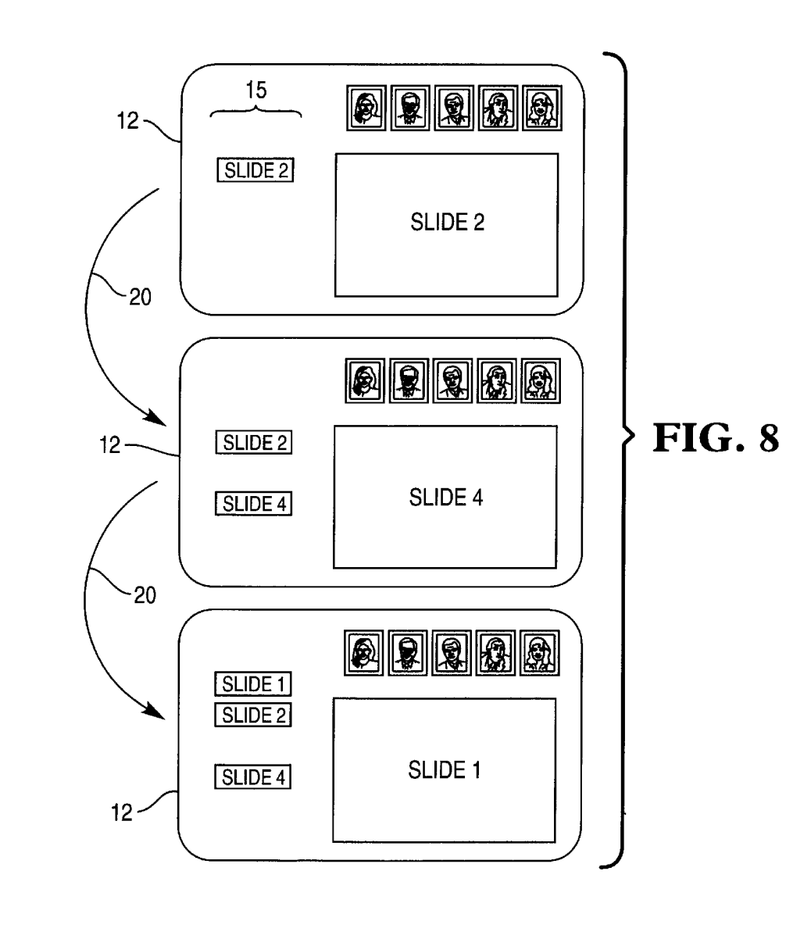
FIG. 8 illustrates how a rank of buttons 15 is developed as a sequence of slides is displayed on a participant's computer.

In addition, as shown in FIG. 8, each computer A–D progressively develops its own column 15 of buttons, as it is instructed to display each slide. For example, the sequence of slides for the computer shown is SLIDE 2, SLIDE 4, SLIDE 1. As arrows 20 indicate, the display 12 sequentially generates buttons for SLIDE 2, then SLIDE 4, and finally SLIDE 1. These buttons allow the user of the computer to review previous slides, independent of activity of the other conference participants, as will be more fully explained later.

Each computer is equipped with an appropriate sound-digitizing card, labeled SD for computer A in FIG. 1, which includes a microphone and speakers (not shown). These cards SD are used to support a telephone conference.

The card SD performs an analog-to-digital (A-to-D) conversion for converting audible speech into digital signals, and a digital-to-analog (D-to-A) conversion for converting incoming digitized speech into audible signals. When a user of a computer speaks, the card digitizes the speech, and software within the computer transmits the digitized speech to the SERVER, for distribution to all other computers. In addition, the SERVER knows the identity of the speaker, either through identifying the data channel carrying the incoming digitized speech, or through a label attached to the data packet of digitized speech. The SERVER distributes this identity information to all other computers also.

Figure 9:
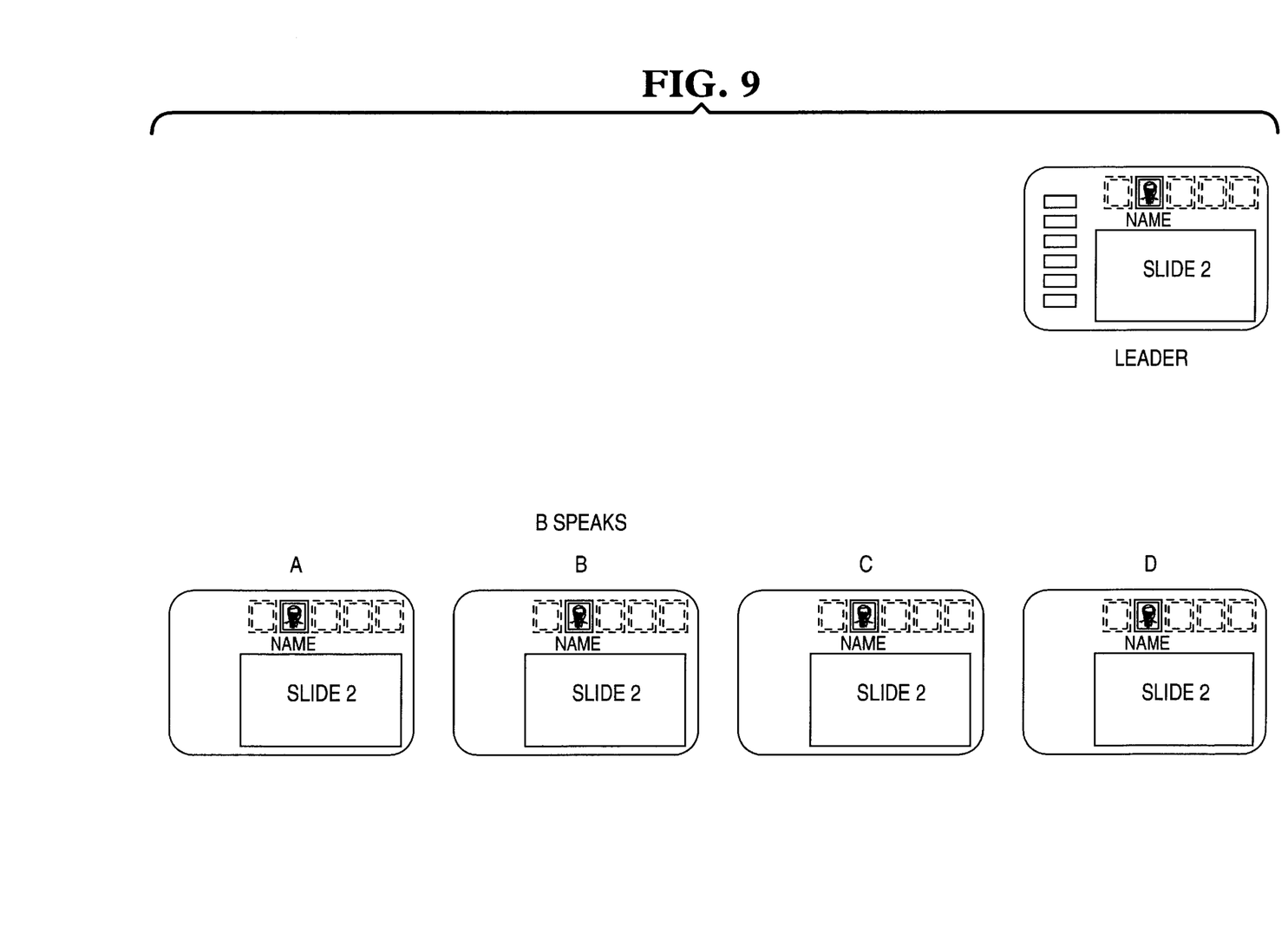
FIG. 9 illustrates highlighting of a person's picture when the person speaks.

The identity information allows the operation shown in FIG. 9. Assume that participant B is speaking. The digitized speech of B is distributed to all computers, which convert that speech into audible form, so that all parties hear B speaking. In addition, the invention causes the picture of B to become highlighted on every computer, as indicated.

If another party wishes to comment on B's speech, that party can address B by name, because B's name appears adjacent B's picture, as FIG. 6 shows. Of course, when the other party makes the comment, that party's picture will also become highlighted. If B stops speaking, highlighting of B's picture terminates.

A problem can arise if two, or more, parties speak at the same time. One resolution to the problem is to prevent its occurrence, as by restricting speech to one person at a time, and allowing the LEADER to select that one person. For example, an icon H may be associated with the picture of each participant in FIG. 6. This icon may resemble a raised hand. Each participant has a switch, or button (not shown) which illuminates that participant's hand-icon H, on every display, or perhaps exclusively on the LEADER's display. When the LEADER sees an illuminated icon H, the LEADER gives permission to speak.

Another resolution is to transmit the speech to the SERVER in packets. Each packet may represent, for example, 0.1 second of speech. If two people speak at once, the packets which are simultaneously received are added, in the mathematical sense, by the SERVER, and the added packet is distributed to the participants. When the sound cards in the computers play the added packets, the participants hear the two parties speaking together. In addition, the SERVER distributes the names of the speaking parties, so that their pictures can be highlighted together.

Figure 10:
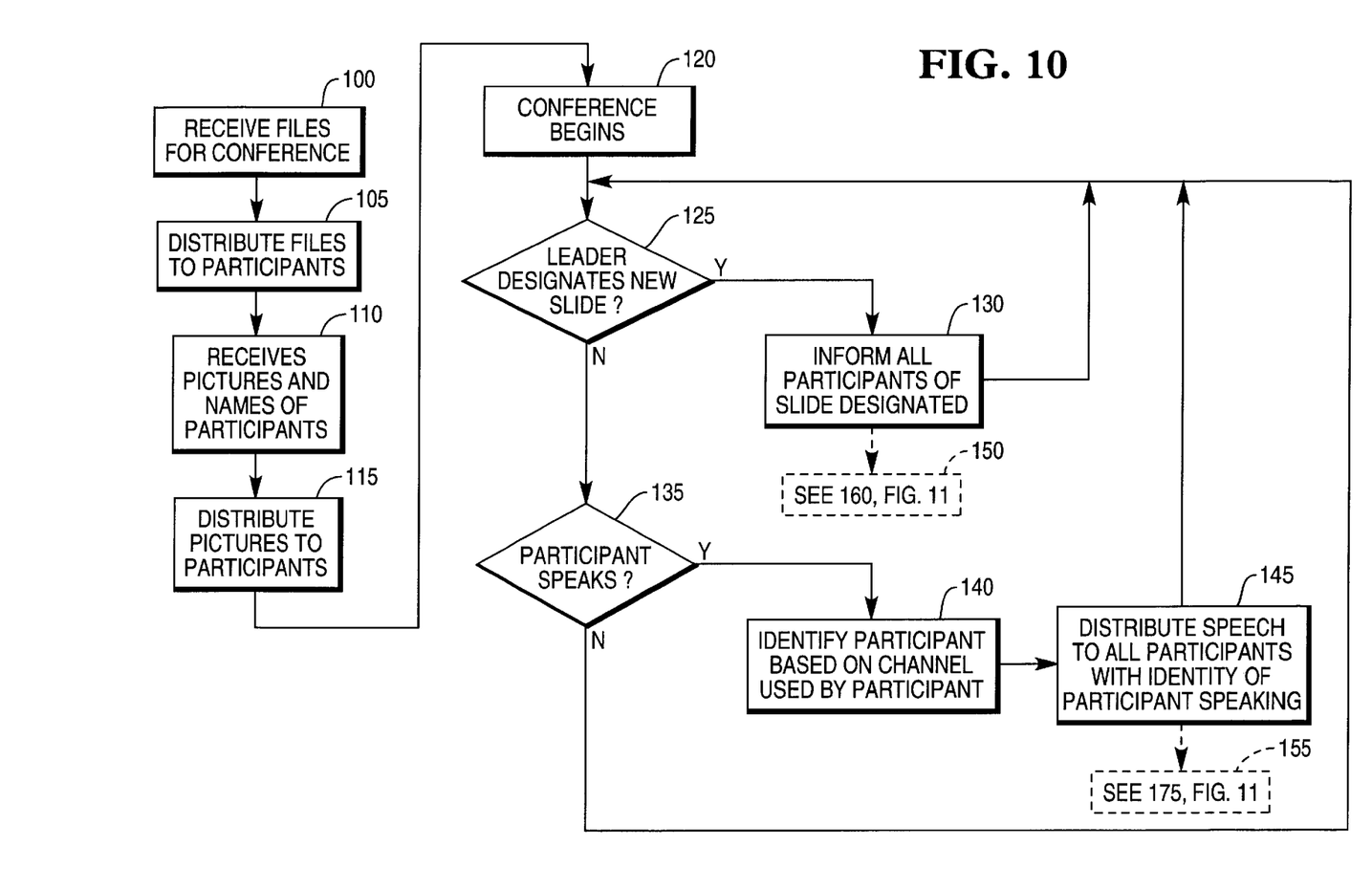
FIGS. 10 and 11 are flow charts illustrating logic implemented by one form of the invention.
Figure 11:
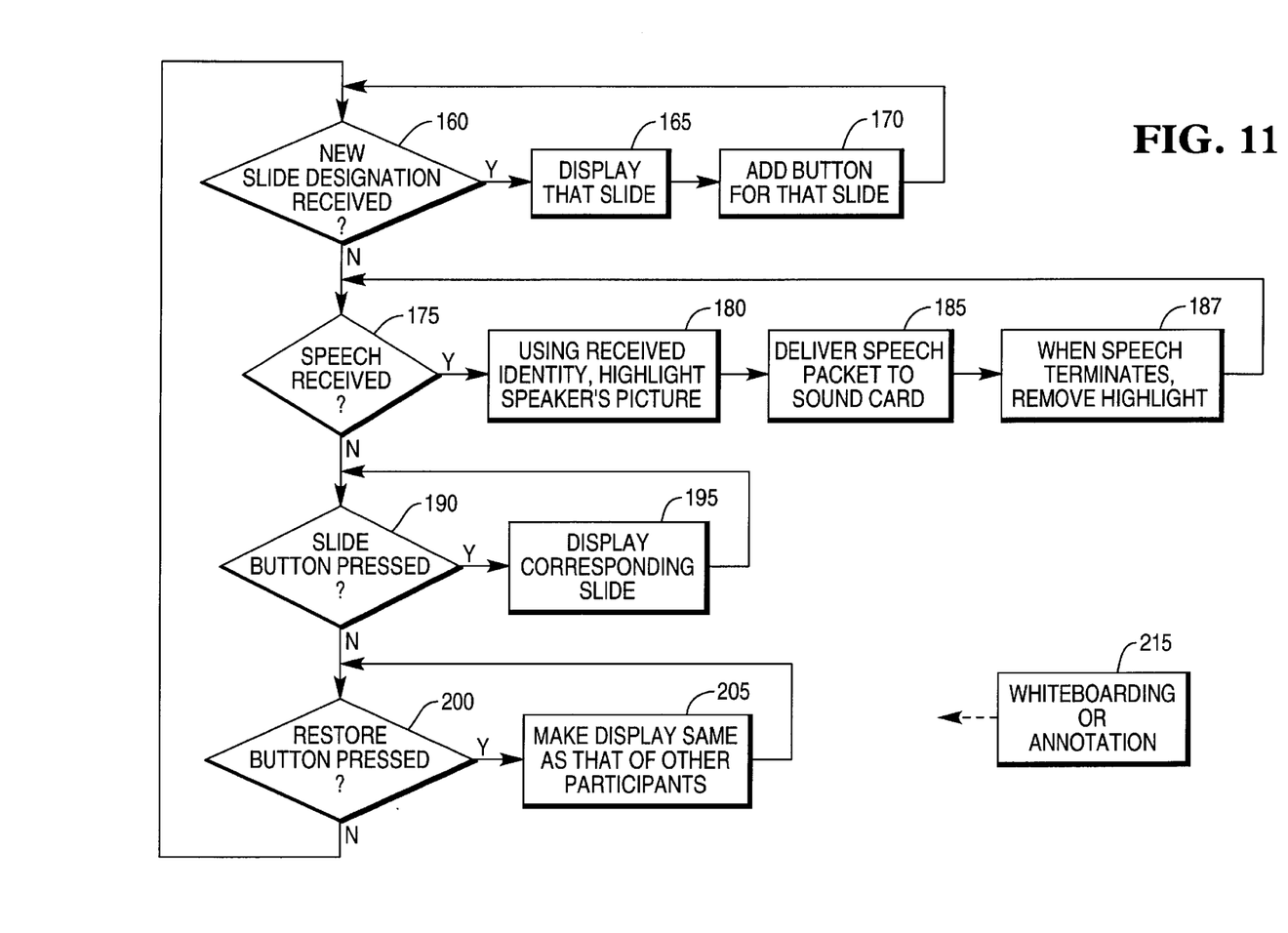

FIGS. 10 and 11 are flow charts of logic implemented by one form of the invention. FIG. 10 indicates primarily events occurring within the SERVER, and FIG. 11 indicates primarily events occurring within the computers A–D, and that assigned to the LEADER.

In FIG. 10, block 100 indicates that the SERVER receives the files 3 of FIG. 2, which contain the visual subject matter of the forthcoming conference. Block 105 in FIG. 10 indicates that the SERVER distributes the files to all conference participants.

Block 110 indicates that the SERVER receives a digitized picture of each participant, together with a name of each participant. Block 115 indicates that the SERVER distributes the pictures, and names, to all participants.

Block 120 indicates that the conference begins. Block 125 inquires whether the LEADER has designated a new slide, as by actuating a button in the column 15 in FIG. 6. If so, block 130 indicates that the identity of this slide is transmitted to all conference participants. The logic returns to block 125.

If no new slide has been designated, the logic reaches block 135, which inquires whether the SERVER is receiving speech from a participant. If so, block 140 identifies the speaker, and block 145 distributes the speech to all participants, together with the identity of the speaker. The logic returns to block 125, and continually cycles through these steps during the conference.

If block 130 is reached, events are induced in the other computers, as indicated by dashed block 150, which refers to block 160 in FIG. 11. That block inquires whether a designation of a slide is received. If so, that slide is displayed, as indicated by block 165, and a button is added, as indicated by block 170. FIG. 8 illustrates addition of the buttons 15.

These buttons 15 allow a user to review previous slides. For example, during conferences, it frequently happens that a sub-group of the participants become occupied in a discussion which does not interest other participants. These buttons allow the other participants to ignore the current slide being displayed, and review others. Blocks 190 and 195 in FIG. 11 indicate these actions.

In FIG. 10, if block 145 is reached, events are induced in the other computers, as indicated by dashed block 155, which refers to block 175 in FIG. 11. That block inquires whether a speech packet has been received by the computer. If so, that computer highlights the picture of the person speaking, as indicated by block 180. The computer plays the speech, as indicated by block 185. When the speech terminates, the highlighting of the speaking party's picture terminates, as indicated by block 187.

If a participant was reviewing slides other than the slide most recently distributed by the LEADER, a time will come when the participant will wish to return to the most recent slide. Block 200 inquires whether the participant is requesting such a return. If so, as block 205 indicates, that participant's display is made current, and displays the same slide as the displays of the others.

In an alternate embodiment, the actions of block 205 may be under control of the LEADER. That is, the LEADER may detect that all participants are straying from the points intended to be conveyed by the LEADER, and may wish to enforce attention upon a common slide.

In another form of the invention, each computer records all events of the conference, including audio proceedings. This recording is a simple process, since the visual images and audio proceedings take the form of recordable digital data.

Figure 12:
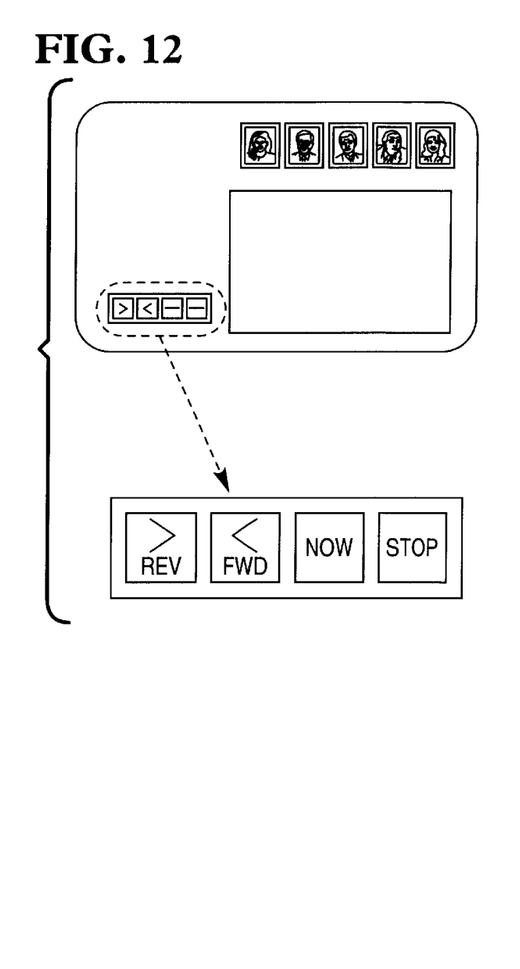
FIG. 12 illustrates a set of buttons by which a participant can review individual images, independent of other participants.

FIG. 12 illustrates another set of buttons, analogous to those used on a tape recorder, which allow a participant to view the recorded conference. The REV and FWD buttons allow a participant to scan through the conference in the reverse, and forward, directions, respectively. When these buttons are pressed, the current proceedings of the conference are either suppressed, or displayed in a separate window. The button labeled NOW allows the participant to jump to the slide being currently discussed. These buttons can be used either after the conference, or during it.

Additional Considerations

1. The conference itself is held using POTS lines, or equivalent. Preferably, the preliminary transfer of the files 3 of FIG. 2 and the photographs is also done using POTS lines, but that is not required.

2. The slides can contain graphic information, pictures, and text.

3. The column of buttons 15 in FIG. 6 allows the LEADER to display slides in any order desired, and to repeat the display of slides. For example, slides 2, 3, and 4 may be displayed, in that order. A participant may raise a question about slide 2. The LEADER can actuate the button for slide 2, causing is to displace the currently displayed slide 4.

4. A whiteboarding function can be added to the invention, as indicated by block 215 in FIG. 11, wherein participants can draw images, or type text, onto a whiteboard. The whiteboard is copied to all other displays. Whiteboarding systems are commercially available.

Whiteboarding should be distinguished from annotation. In whiteboarding, the participants begin with an essentially blank screen, and mark it up. In some whiteboarding systems, the participants can begin with a predetermined image, such as (1) a drawing previously made using the whiteboarding system, (2) a drawing made in another system and imported into the whiteboarding system, or (3) a physical drawing which is scanned, digitized, and then imported into the whiteboarding system. But, in all three cases, the whiteboarding software generates the image contained on the whiteboard.

In contrast, in annotation, an image is generated by any selected application program, and the participants mark up that image. But the annotation software does not generate the basic, underlying image. Instead, the annotation software draws graphic images over the image generated by the application program, as by loading the appropriate data into video RAM, over the data generating the underlying image.

An example of annotation is found in U.S. Pat. No. 5,608,872, Ser. No. 34,313, issued Mar. 4, 1997, in which the inventors are Schwartz, Carleton, FitzPatrick, and Pommier. An example of whiteboarding is found in U.S. Pat. No. 5,528,290, Ser. No. 303,918, issued Jun. 18, 1996, in which the inventor is Saund, et al.; in U.S. Pat. No. 5,717,869, Ser. No. 552,968, issued Feb. 10, 1998, in which the inventor is Moran, et al.; and in U.S. Pat. No. 5,717,879, Ser. No. 552,960, issued Feb. 10, 1998, in which the inventor is Moran, et al. The preceding patents are incorporated by reference.

5. U.S. Pat. No. 5,604,341, entitled "ATM as Video Conferencing Station," Ser. No. 403,145, issued Feb. 18, 1997, in which the inventors are Grossi, Paton, and Schneider, illustrates one type of video conferencing, and is hereby incorporated by reference.

6. It is observed that a given link L in FIG. 1 carries not only voice data, but also the data which designates which slides the computers A–D are to display. The slide-designation data is interleaved among the digitized voice packets, in time-multiplex fashion. In one form of the invention, the voice-grade links L carry no other information.

In another form of the invention, whiteboarding or annotation data is also interleaved among the voice packets along with the slide-designation data. In this case, the links L carry whiteboarding data, voice packets, and slide-designation data.

In another form of the invention, the links L carry voice packets, slide-designation data, and data identifying parties who are currently speaking.

In the embodiments described above, it was stated that all data is digital, and interleaved together. However, links L can be implemented in "analog" format. That is, links L carry voice information in the usual manner. The slide-designation data, speaker-identification data, and other types, are superimposed over the voice data. For example, the data can take the form of DTMF (Dual-Tone Multi-Frequency) signals. Or the data can be carried by a modem signal, which is periodically injected over the voice data.

7. In general, the data carried on links L in FIG. 1 is carried on a modulated carrier signal. A modem M in computer A generates the modulated carrier. That is, the links L do not carry a DC voltage which is either high or low. In contrast, some network channels, such as ISDN channels, are bus-type, wherein all lines carry either high, or low, voltages; no modulated carrier is involved. If links L represent common-carrier telephone lines, the information carried by them may be converted into digital format at the respective central offices of the telephone company. This format may be digital. But, under one form of the invention, the computers A–D see links L which require a modem, or equivalent, to transfer data.

8. It is emphasized that the logic flow charts described herein are illustrative only. For example, the logic of FIG. 11 is framed in terms of do-loops for ease of explanation. However, there is no implication, or requirement, that the tasks of one loop be completed, prior to execution of a subsequent loop.

For example, a literal interpretation of FIG. 11 would conclude that the speech of block 185 must be completed, before a new slide could be displayed by block 195. But, clearly, it is understood that a new slide can be displayed while a person is speaking.

In actual practice, the actions depicted in the flow charts are intended to occur nearly simultaneously, and repeatedly. It is expected that parallel "threads" will implement many of the steps, as that term is used in the art of computer engineering.

9. Packetized data was discussed above. Packets are not strictly necessary, a quasi-synchronous data stream can be used.

10. In another form of the invention, the parties hold a standard multi-party telephone conference, using voice grade telephone lines. The speaker-identification data is carried by a second channel, outside the voice-grade telephone channel. The second channel can take the form of a network available to connect the parties, such as the INTERNET or World Wide Web.

In this embodiment, the telephone service provider, or telephone company, identifies each speaker, as the person speaks, at the telephone bridge. More specifically, the telephone company identifies the telephone line, by telephone number, carrying speech to the bridge. (The "bridge" is an apparatus which interfaces the telephone subscriber's analog line to the digital transmission facilities used by the telephone company to carry calls.)

The telephone company places the speaker-identification data onto the second channel. The parties' computers receive this data, and use it to identify the current speakers, as described above.

In addition, the slide-designation data can be transferred using the second channel. However, unlike the speaker-identification process, the leader's computer places the slide-designation data onto the second channel, not the telephone company.

Figure 13:
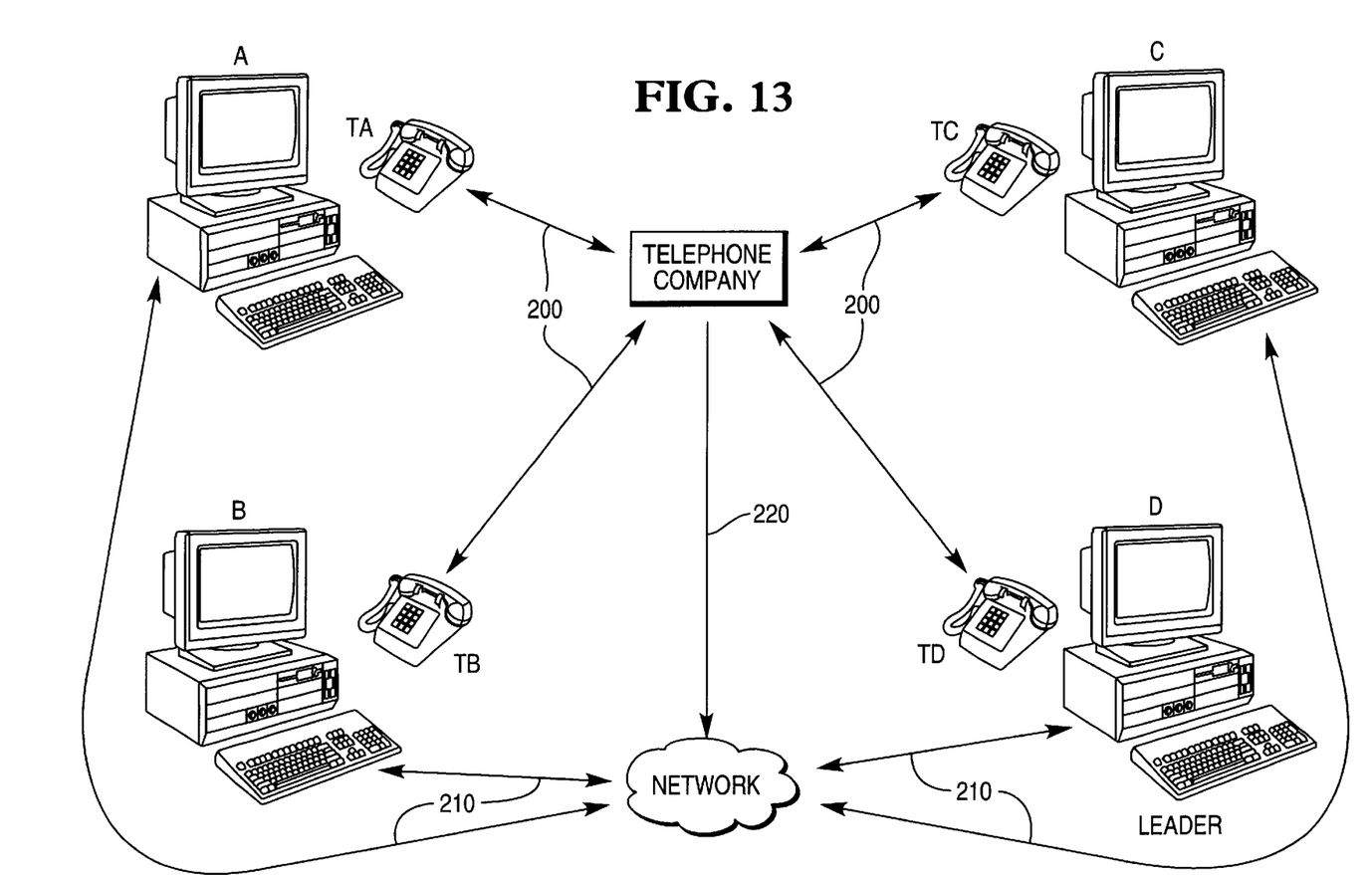
FIG. 13 illustrates one form of the invention.

FIG. 13 illustrates this embodiment graphically. The parties are equipped with ordinary telephones TA, TB, TC, and TD. The parties hold an analog, voice-grade, multi-party telephone conference over lines 200.

During the conference, the telephone company identifies each speaker, as speech occurs, and places speaker identification data onto a second channel, via link 220, which leads to a NETWORK, which may be the INTERNET. Each party's computer fetches the identification data from the second channel, via links 210, and uses it to highlight a picture of the speaker.

The leader's computer places slide-designation data onto the second channel, using link 210. The parties' computers fetch this data from the second channel, and use it to select, and display, the appropriate slides.

Numerous substitutions and modifications can be undertaken without departing from the true spirit and scope of the invention. What is desired to be secured by Letters Patent is the invention as defined in the following

What is claimed is:

1. A method of holding a remote conference among participants, comprising the following steps:
   a) prior to the conference, transferring digitized images to participants' computers;
   b) during the conference,
      i) causing images designated by a conference participant to be displayed on the computers, through signals received on a voice-grade telephone channel; and
      ii) maintaining an audio conference using said channel.

2. A method of holding a conference among a group of computers, comprising the following steps:
   a) prior to the conference, transferring image-data to the computers;
   b) during the conference, as a participant speaks,
      i) capturing the speech and distributing it to other computers, using POTS channels; and
      ii) indicating to other computers the identity of the speaking participant; and
   c) causing the computers to display a common image, selected from the image data stored locally in each computer.

3. Method according to claim 1, wherein no other conference information is transmitted among the participants during the conference, apart from said signals and said audio conference.

4. A system for participating in remote conferences using a computer, consisting essentially of:
   a) software means for running on the computer and
      i) receiving data packets from a remote conference participant and, in response,
      ii) selecting images from local storage and displaying the images;
   b) means for holding a telephone conference using the computer; and
   c) a modem connecting the computer to a voice-grade telephone line, for carrying said speech packets and the telephone conference.

* * * * *